(12) United States Patent
Penisoara et al.

(10) Patent No.: US 8,369,844 B2
(45) Date of Patent: Feb. 5, 2013

(54) DEVICE AND METHOD FOR TRANSMITTING DATA IN A WIDEBAND WIRELESS NETWORK AND COMPUTER PROGRAM PRODUCT

(75) Inventors: Nicusor Penisoara, Bucharest (RO); Victor Berrios, Gilbert, AZ (US); Razvan-Mihai Lucaci, Suceava (RO); Lawrence Roshak, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 472 days.

(21) Appl. No.: 12/600,691

(22) PCT Filed: May 31, 2007

(86) PCT No.: PCT/IB2007/052045
§ 371 (c)(1),
(2), (4) Date: Nov. 18, 2009

(87) PCT Pub. No.: WO2008/146095
PCT Pub. Date: Dec. 4, 2008

(65) Prior Publication Data
US 2010/0150067 A1    Jun. 17, 2010

(51) Int. Cl.
*H04M 3/00* (2006.01)
*H04W 24/00* (2009.01)
*H04W 4/00* (2009.01)
(52) U.S. Cl. ......... 455/418; 455/423; 370/328; 370/338
(58) Field of Classification Search .................. 370/328, 370/338; 455/41.2, 41.3, 418, 423, 424, 455/425
See application file for complete search history.

(56) References Cited

U.S. PATENT DOCUMENTS

| | | | |
|---|---|---|---|
| 6,157,616 A | 12/2000 | Whitehead | |
| 2002/0141332 A1* | 10/2002 | Barnard et al. | 370/218 |
| 2003/0086427 A1* | 5/2003 | Lee et al. | 370/394 |
| 2003/0181213 A1* | 9/2003 | Sugar et al. | 455/454 |
| 2006/0067208 A1* | 3/2006 | Hoga et al. | 370/216 |
| 2006/0215560 A1* | 9/2006 | Sebire et al. | 370/235 |
| 2007/0042733 A1 | 2/2007 | Tomioka | |
| 2007/0047570 A1* | 3/2007 | Benveniste | 370/448 |
| 2007/0105542 A1* | 5/2007 | Friedman | 455/420 |
| 2007/0105548 A1* | 5/2007 | Mohan et al. | 455/426.1 |
| 2008/0144500 A1* | 6/2008 | Chen et al. | 370/235 |

* cited by examiner

FOREIGN PATENT DOCUMENTS

| | | |
|---|---|---|
| EP | 1515474 A | 3/2005 |
| GB | 2431548 A | 4/2007 |

OTHER PUBLICATIONS

International Search Report and Written Opinion correlating to PCT/IB2007/052045 dated Jan. 30, 2008.

*Primary Examiner* — Christopher M Brandt

(57) ABSTRACT

A device for transmitting data in a wideband wireless network. The device may include a transmitter for transmitting data via a channel of the wideband wireless network, the transmitter is arranged to start the transmitting in response to a start signal. A first transmission controller is connected to the transmitter, for controlling transmission of data by the transmitter. The transmission controller includes an energy detector for detecting the amount of energy in the channel. The energy detector is arranged to repeat the detecting in response to a repeat signal. A comparator is connected to an output of the energy detector and to a control input of the transmitter. The comparator is arranged to compare the detected amount of energy with an energy threshold, to output the repeat signal to the energy detector in case the detected amount of energy exceeds the energy threshold; and to output the start signal to the transmitter when the detected amount of energy is below the energy threshold.

20 Claims, 2 Drawing Sheets

DEVICE AND METHOD FOR TRANSMITTING DATA IN A WIDEBAND WIRELESS NETWORK AND COMPUTER PROGRAM PRODUCT

FIELD OF THE INVENTION

This invention relates to a device for transmitting data, to an apparatus including such as device, to a wideband wireless network including such a device and to a computer program product.

BACKGROUND OF THE INVENTION

Wireless wide band networks are generally known and commonly used, for example to connect computers to each other. However, with the increase of the number of networks, obtaining a sufficient connection between two devices in the network becomes increasingly difficult. For instance, interference by sources of electromagnetic radiation may hamper the transmission of data. In case the network has wireless channels at a frequency of about 2.4 GHz, interference is likely from e.g. microwave ovens, Bluetooth links or other wireless transmission systems that operate in the frequency band of about 2.4 GHz. Accordingly, there is a chance that a data channel cannot be used or that data transmitted by a transmission device will not be received (correctly) by a receiving device.

From IEEE standard specification 802.15.4, it is known to provide a wireless wideband communication network with a receiving device which transmits a receive acknowledgement to a transmitting device in response to a reception of data by the receiving device. In case the transmitting device does not receive the acknowledgement within a predetermined period of time after the data was sent, the transmitting device resends the data.

However, a disadvantage of the prior art system specified by this IEEE standard is that, although this reduces the risk that data is not received, a relatively large risk of faults remains. For instance, in case the interference exhibits a periodic behaviour the acknowledgement may be lost in a period of active interference despite the fact that the data has been received correctly or the transmitter may miss periods of interference inactivity during which data could have been sent.

Furthermore, in case the receiving device has to react in response to the transmitting device, such as in case of a remote control, an undesired delay between the first transmission of the data and the reaction of the receiving device may occur.

SUMMARY OF THE INVENTION

The present invention provides a device for transmitting data, an apparatus, a wideband wireless network and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
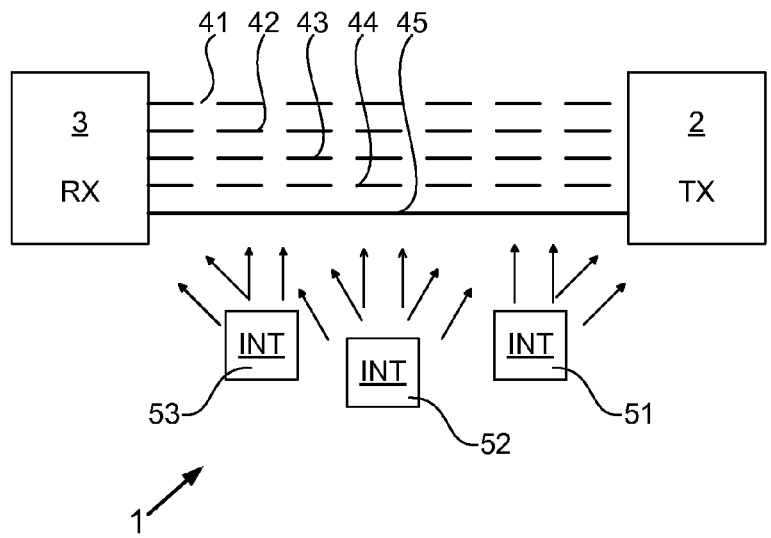
FIG. 1 schematically illustrates an example of an embodiment of a wideband wireless network.

Referring to FIG. 1 an example of a wideband wireless network 1 is shown. The wideband wireless network 1 may include a transmission device (TX) 2 and a receiving device (RX) 3. In the example, for sake of simplicity, only one transmission device 2 and one receiving device 3 are shown, however it will be apparent that the wideband wireless network 1 may include two or more transmission devices and/or two or more receiving devices. For instance, the wideband wireless network 1 may include one or more point-multipoint (sub)networks in which a single transmission device 2 can transmit data to one, two or more receiving devices 3 and/or in which one, two or more receiving devices can receive data from a single transmitting device 2.

The wideband wireless network 1 may include one or more data channels 41-45 (in FIG. 1 five data channels are shown, however it will be apparent that the wideband wireless network 1 may include more or less data channels). The data channels 41-45 may connect the transmission device 2 to the receiving device 3. The data channels 41-45 may for example be wireless communication channels.

The data channels 41-45 may for example differ in frequency and/or modulation scheme and/or coding scheme and/or any other manner suitable to distinguish data channels from each other. In a data communication network compliant or compatible with the IEEE 802.15.4 standard, for example, the channels have different frequencies. In this respect, it should be noted that frequency channels are commonly identified by their center frequency, but a channel may actually be a frequency band including the center frequency, and may for example be a frequency band centered around the center frequency of the respective channel, for example with a width of 5 MHz. In a data communication network compliant or compatible with the IEEE 802.15.4 standard, sixteen channels are available in the 2450 MHz band, ten in the 915 MHz band, and one in the 868 MHz band. Thus, in case the data communication network is compliant or compatible with the IEEE 802.15.4 standard and operating in the 2.4 GHz frequency band, the frequency may for instance be increased or decreased with the amount required to set a transmitter 21 to an adjacent channel in the 2.4 GHz frequency band.

Figure 2:
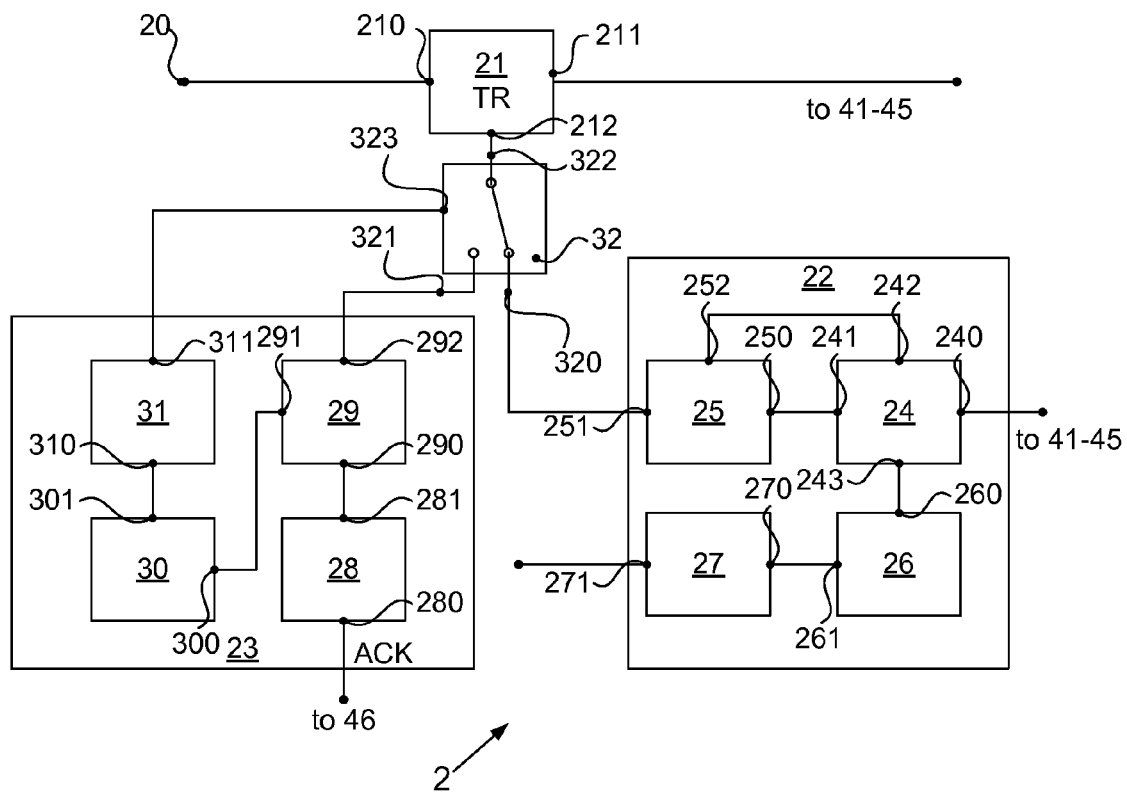
FIG. 2 schematically illustrates an example of an embodiment of a device for transmitting data.
Figure 3:
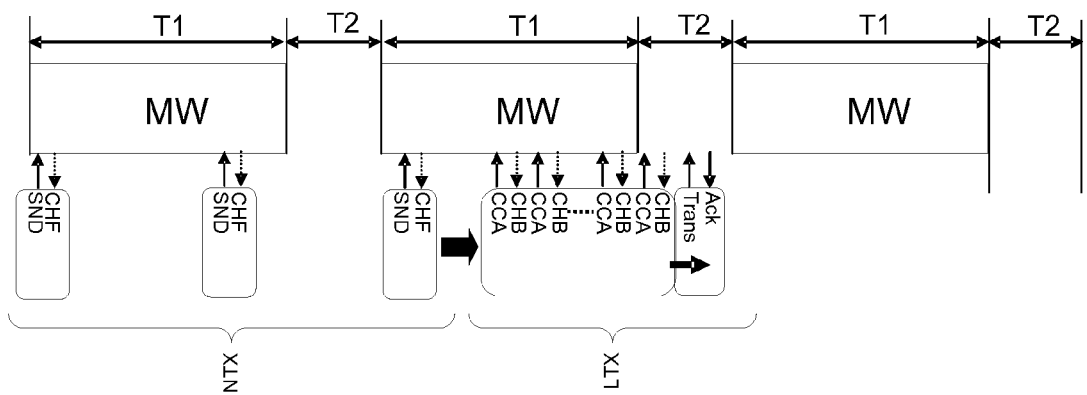
FIG. 3 schematically illustrates a method for transmitting data.

As shown in FIG. 2 in more detail, the transmission device 2 may transmit data to the receiving device 3 via one or more of the data channels 41-45. The receiving device 3 may be able to receive data from the transmission device 2 via one or more of the data channels 41-45. However, as shown in FIG. 1, in addition to the transmission device 2, one or more other, interfering, signal sources (INT) 51-53 (such as microwave ovens) may be present in the environment of the wideband wireless network 1. The other sources 51-53 may transmit signals which at least partially affect the transmission of data through the data channel 41-45, for example by emitting radiation which has frequency components interfering with the frequency of one or more of the data channels 41-45. As illustrated in FIG. 3, the interference MW may for example exhibit a periodic behaviour and be active during periods of time T1 while being inactive during periods of time T2.

The transmission device 2 may be implemented in any manner suitable for the specific implementation. The transmission device may for instance be compliant or compatible with the IEEE 802.15.4 standard or with the Zigbee standard. However, the transmission device 2 may also or alternatively be compatible or compliant with other communications standards.

The transmission device 2 may, as for instance shown in FIG. 2, include a transmitter 21 which can transmit data via a selected channel of the wideband wireless network data, e.g. by presenting the data at a transmitter output 211.

The transmitter 21 may be any suitable type of transmitter. The transmitter 21 may for example be arranged to transmit the data in a short period of time. For example the transmitter may be of a type that transmits data in packets and require a period of time to transmit a complete packet which is equal to or less than the inactive period of a source of intermittent interference, such as a microwave oven. The short period of time may, for instance be 10 ms or less, such as for example. The transmitter 21 may for instance have a data transmission rate of less than 2 Mb per second.

The transmitter 21 may start the transmitting in response to a start signal. As shown in FIG. 2, the transmitter 21 may for instance have a control input 212 and start transmission of the data in response to reception of the start signal at the control input 212. In case, for instance, the transmitter 21 receives the data at a transmitter input 210 from another device prior to the start signal, the data may for instance be stored in a buffer until the start signal is received.

As shown in FIG. 2, the device 2 may include a first transmission controller 22 connected to the transmitter 21. The first transmission controller 22 may control the transmission of data by the transmitter 21. The first transmission controller 21 may include an energy detector 24 and a comparator 25.

The energy detector 24 may detect the amount of energy in the channel to be used by the transmitter 21. As indicated in FIG. 2, the energy detector 24 may for example have a detector input 240 which is connected to the selected channel and determine a value of a parameter which forms a measure for the energy, such as the intensity of electro-magnetic radiation in the frequency range corresponding to the channel. At a detector output 241 a signal representative for the determined amount of energy in the channel may be outputted by the energy detector 24.

The comparator 25 may be connected to the detector output 241. As shown in FIG. 2, the comparator 25 may have a comparator input 250 connected to the detector output 241. A comparator output 251 may be connected to the control input 212 of the transmitter 21. The comparator 25 may compare the determined amount of energy with an energy threshold value.

The energy threshold value may be set to any value suitable to discriminate between conditions in the channel suitable for transmission and conditions affecting the transmission. For example, the energy threshold value may be set to a value above the level of energy attributed to background noise and/or below a level at which the signal to noise ratio becomes too low to have a reliable transmission.

In case the detected amount of energy exceeds the energy threshold value, this implies that the conditions in the channel are not suitable for transmission of the data. The comparator 25 may then output, e.g. via a first comparator output 252, a continue signal to a control input 242 of the energy detector 240 in response to which the energy detector 240 may continue the detection.

When the detected amount of energy is below the energy threshold, this implies that the sources of interference are either absent or inactive and hence that the conditions in the channel are suitable for transmission of the data. The comparator 25 may output the start signal to the transmitter 21 via a second comparator output 251. The transmitter 21 may, in response to receiving the start signal, transmit the data through the channel.

As shown in FIG. 2, the transmission device 2 may, for example, include a second transmission controller 23 connected to the transmitter 21. The second transmission controller 23 may be able to detect the reception by one (or more) of the receiving devices 3 of the transmitted data. The transmission device 2 may determine the reception of the data by the receiver unit 3 in any suitable manner. As shown in FIG. 2, the second transmission controller 23 may for instance include a reception detector 28. The reception detector 28 may detect whether transmitted data has been received by the receiver unit 3. For instance, the reception detector 28 may for example be arranged to receive a reception acknowledgement (ACK) from the receiving device 3. As shown in FIG. 2 the reception detector 28 may, for instance, be connected to a control channel via which the receiver unit 3 can transmit communication control data to the transmission device 2. The control channel 46 may for example be the same channel as the transmission channel and/or the receiving channel or be a different, e.g. dedicated, control channel. As shown in the example of FIG. 2, for instance, the reception detector 28 may be connected with a detector input 280 to the control channel 46, in order to receive and/or transmit communication data from and/or to the receiver unit 3.

The reception detector 28 may detect the reception in any suitable manner. The reception detector 28 may for example be connected to the control channel to monitor whether or not acknowledge data (ACK) has been received by the transmitting unit 2. The receiver unit 3 for example may be configured to transmit receipt acknowledge data (ACK) to the transmission device 2 via the control channel 46 in response to the reception of data by the receiver unit 3. The reception detector 28 may then determine that the transmitted data has not been received by the receiver unit 3 in case the acknowledge data ACK has not been received in within a certain period of time.

The second transmission controller 23 may initiate one or more operations when the detector 22 determines that the data has not been received by the receiver unit 3. For instance, the reception detector 28 may for example control the transmitter 23 to repeat the retransmission in case the ACK is not received, e.g. within the time-out period.

Furthermore, the reception detector 28 may reset the timer 29 and reactivate the timer 29 when the transmitter 23 resends the transmitter data via the next transmission channel. In case the reception detector 28 does not receive the acknowledge data (ACK) within the time-out period after resending the transmitted data, the reception detector 28 may initiate another reselection of the transmission channel by the transmission channel selection unit 21.

The second transmission controller 23 may control the transmitter 21 to retransmit the data when the receipt acknowledgement is not received within a predetermined period of time. As shown in FIG. 2, for instance, the reception detector 28 may be connected with a detector output 281 to a timer input 290 of a timer 29. The timer 29 may time the period of time lapsed after the data has been sent and control the transmitter 21 to re-transmit the data when said acknowledgement is not received within a predetermined period of time. The timer 29 may for example compare the timer value with a predetermined timer threshold and output a re-transmit signal at a timer output 292 which is connected to a control input 212 of the transmitter 21 when the timer value exceeds the timer threshold.

Suitable values for the time-out value have found to be in the range of less than 5 ms, such as less than 2 ms. For example, in a data communication network compliant with the IEEE 802.15.4 standard, a good reliability has been found for time-out values lower than 2 ms and/or higher than 0.5 ms, such as in the range from 0.8 ms to 2 ms, for example from 864 μs to 1920 μs. The time-out value may for example be dependent on the selected transmission channel and/or the number of retransmissions. For instance, the time-out value may be between 0.5 ms and 1 ms, such as in the range from 0.7 up to and including 1 ms, such as 864 μs for example, for a channel in the 2.4 GHz band. The time-out value may for example be in the range between 1 ms and 2 ms, such as in the range from 1.5 up to and including 2 ms, such as 1920 μs for example, for a channel in the 800 MHz band.

The second transmission controller 23 may include a retransmission counter 30 which can count the number of retransmissions The retransmission counter 30 may be connected with a counter input 300 to an output 291 of the timer 29, e.g. by monitoring the timer output 291 and incrementing a counter every time the re-transmit signal is outputted. The retransmission counter 30 may be connected with a counter output 301 to a comparator input 310 of a comparator 31. The comparator 31 may compare the number with a transmission failure threshold.

The comparator 31 may output a transmission failed signal in case the number exceeds the threshold. The transmission failed signal may for example be presented at an output 311. As shown in FIG. 2, the output 311 of the comparator 31 may for instance be connected to a control input 323 of a switch unit 32. The switch unit 32 may select the first transmission controller 22 in response to the transmission failed signal from the second transmission controller 23 and deselect, in response to the transmission failed signal, the second transmission controller 23. As shown in FIG. 2, for instance, the first transmission controller 22 and the second transmission controller 23 may both be connected to the control input 212 of the transmitter 21 via the switch unit 32. In the example of FIG. 2, each of the transmission controllers 22,23 is connected to a respective switch input 320,321 while an output of the switch 32 is connected to the controller input 212.

The switch 32 allows signals to propagate from a selected one of its inputs 320,321 to the switch output 322 and inhibits the propagation of signals from not-selected switch inputs 320,321 to the switch output 322. Accordingly, the switch 32 can select which transmission controller 22,23 controls the transmitter 21. (In the example of FIG. 2, the first transmitter controller 22 is selected).

As e.g. illustrated in FIG. 3, for instance, the second transmission controller 23 may be arranged to control the transmission (and re-transmission when the acknowledgement ACK is not received) of the data to be in a normal transmission mode NTX. In the normal transmission mode, for example, the energy in the channel may be measured prior to a transmission of data. When the channel is found to be busy (there is energy in the channel), a back-off period may then be taken. The channel energy may then be measured after again this back-off. The back-off duration may be random in value and/or may increase as the number of back-offs taken increases. For example, the back-off duration may be chosen randomly between zero (not taking into account a certain minimum period of time, (much) shorter than the superior margin for the back-off period, e.g. 0.5 ms or less, for example 320 microseconds (.mu.s) or less required to set the energy detector) and an exponentially increasingly superior margin. The superior margin may for example have a value of 1 ms or less, such as 992 microseconds, for example. The superior margin may be increased for every unsuccessful attempt. After a number of such retries to access the channel (for example three retries, so a total of four tries), the transmission device 2 may give up the operation.

The normal transmission mode NTX may for instance be a transmission mode in which an acknowledgment receipt is requested, as is for example specified in the IEEE 802.15.4 standard specification. As shown in FIG. 3, data may be transmitted 'SND' and that there was a channel failure 'CHF' when the acknowledge receipt is not received within the predetermined period of time. As illustrated in FIG. 3, for example, intermittent interference MW may be present causing the loss of the data before arrival or the loss of the receipt acknowledgment. As shown in FIG. 3, a period of time may be present between successive transmissions of the data, which for instance is dependent on the counter value of the retransmission counter 30.

When, in the normal transmission mode NTX, the data has been retransmitted a number of times corresponding to the failure threshold (e.g. three in the example of FIG. 3), the second transmission controller 23 may output the failure signal, for instance to the switch control input 323. In response to this signal, the switch 32 may select the first transmission controller 22 and deselect the second transmission controller 23, and hence switch the transmission mode of the transmission device 2 from the normal transmission mode NTX to a special transmission mode.

As illustrated in FIG. 3, the first transmission controller 22 may for example control the transmission device 2 to be in a special transmission mode. In the special mode e.g. a clear channel assessment 'CCA' may be performed in which the amount of energy present in the channel is determined before transmitting the data. As illustrated in FIG. 3, in case the amount of energy is above the energy threshold, the channel may be determined to be in a channel busy state 'CHB'. The transmission controller 22 may then continue the clear channel assessment CCA during a period of time, until either the channel is found to be available, e.g. not in a busy state or until the period of time reached a maximum. When the channel is found to be available, the transmission controller 22 may transmit the data (and receive the acknowledgement), as indicated with the transmitting state 'Trans' in FIG. 3. The transmission device 2 may give up the transmission when the channel is not found to be available before the period of time reached the maximum.

As illustrated in FIG. 2, the first transmission controller 22 may include a timer 26 for timing the period of time the detecting the amount of energy has been performed. As shown in FIG. 2, the timer 26 may be connected with a timer input 260 to an output 243 of the energy detector 24. The timer 26 may receive information via the timer input 260 which allows the timer 26 to determine that the detection is (being) performed, for example an start timer value signal which is outputted by the energy detector 24. The timer 26 may have a timer output 261 which is connected to a comparator input 270. Via the timer output 261, a timer value representing the determined period of time may be outputted to the comparator 27.

The first transmission controller 22 may further include a comparator 27 for comparing the period timed by the timer 26 with a failure threshold. The comparator 27 may output, at a comparator output 271, a transmission failed signal in case the period exceeds the threshold. The fail signal may for instance be transmitted to a device connected to the comparator output 271. The device may for instance switch off the transmitting unit 2 in response to the fail signal and/or output a message in a for humans perceptible form, such as a beep or a flash of light, at a man-machine interface.

The transmission device 2 and/or receiving device 3 may form part of any suitable electronic apparatus or device. For example, the transmission device 2 may form part of a device which controls the operation of the apparatus into which the receiving device 3 is implemented, e.g. a remote control. The transmitter 21 may then be arranged to transmit remote control data to a remote controlled device. The remote control may for example control a household appliance, an electric or electronic devices, such as for instance a television, a radio, a music player, a personal computer, an air-conditioning system, a security system, a light switches, or any other suitable device, apparatus or system.

Figure 4:
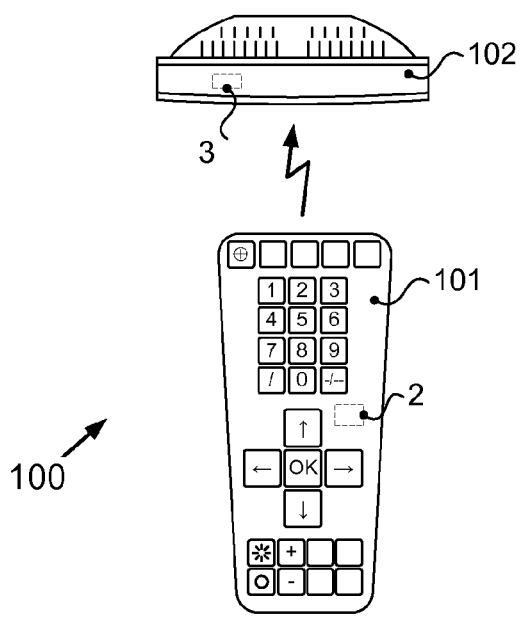
FIG. 4 schematically illustrates an example of an embodiment of a control and/or monitoring system.

Referring to FIG. 4, by way of an example, a television system 100 is shown. The television system 100 may include a remote control 101 and a television 102. As shown, the remote control 101 may include a transmission device 2 and the television may include a receiving device 3. The remote control 101 may transmit via the transmission device 2 television control data, for example generated by a user pressing buttons on the remote control 101 or another suitable type of input by a user via a user-interface. The receiving device 3 may receive television control data and output the received televisions control data to a (not shown in FIG. 4) television controller which operates the television 102 accordingly. The television controller may for example set the television channel, the volume of the audio outputted by the television 102, the brightness of the television screen or another suitable parameter of the television in accordance with control instructions in the television control data.

The transmission device 2 may transmit any type of data suitable for the specific kind of network. The data may for example include data generated by the transmission device 2, for instance to set up a communication between the transmission device 2 and the receiver unit 3. The data generated by the transmission device may for example include channel control data which may be used to set up a communication between the transmission device 2 and the receiver unit 3, such as the network address of the transmission device 2, data regarding the type of transmission device 2 or other suitable data.

However, it is also possible that the transmission device 2 receives at an input 20 data from another data generating device and transmits the data to the receiver unit 3 via the transmission channel. The data generating device may for example include: a remote control and/or a monitoring device and/or a sensor device and/or a home appliance and/or any other suitable data generating device. As shown in the example of FIG. 2, for instance, the transmitter 21 may have a data input 210 which is connectable to a data generating device. The transmitter 21 may receive at the data input 210 data and process the data in order to be suitable to be transmitted via the transmission channel. The transmitter 21 may for example generate data packets from the received data and/or code the received data and/or multiplex the received data and/or modulate the received data and/or perform any other suitable operation on the data.

The transmission device 2 may transmit the data in any suitable manner. The transmission device 2 may for example operate as a continuous transmitter, an intermittent transmitter, a periodic transmitter or a repetitive transmitter.

In case the transmission device 2 operates as an intermittent transmitter of data, that is transmits data during a transmitting period of time and then not transmit data during a silent period of time (of variable length), the transmitting period may for example be 5 ms or less and/or more at least 0.2 ms. The silent period may for example be in the range of 1 ms to a number of days, depending on the specific application. The transmitter 21 may for example transmit remote control data to a receiver unit 3 which can control the operation of an apparatus, such as for example remote control data for a television, a stereo, a light switch or other suitable device or apparatus.

In case the transmission device 2 is a periodic transmitter, that is transmits a variable amount of data at periodic points in time, the intervals between transmissions may for example be in the range of 5 ms to a number of days depending on the specific application. In such case, the transmission device 2 may for example transmit data from a wireless sensor or meter. The transmission device 2 may for example be switched into an active mode and transmit the data and be switched into a sleep mode after the data has been transmitted and be switched into the active mode a following time the sensor or meter wants to send data.

In case the transmission device 2 is a repetitive transmitter, that is transmits the same amount of data at periodic points in time, the intervals between transmissions may for example be in the range of 5 ms to a number of days, depending on the specific application. For example, the transmission device 2 may have been allocated a time-slot to transmit the data, thereby ensuring that the transmission device 2 can indeed transmit the data. The repetitive transmission may for example be used to transmit data from a sensor in a security system to a monitoring unit.

The energy detector 24 may be implemented in any manner suitable for the specific implementation. The energy detector 24 may detect the amount of energy caused by interference in the channel to be used by the transmission device 21. For instance, in case the data channels 41-45 have different frequencies, the energy detector 24 may be arranged to detect the energy in the frequency band corresponding to the selected receiver channel. As mentioned, the energy detector 24 may, for instance, be connected with an input 240 to the selected receiver channel. As illustrated in FIG. 2, the energy detector 24 may for example be connected to the other data channels 41-45 as well.

The energy detector 24 may be arranged to detect an amount of energy in the signals presented at the input 240. The energy detector 24 may detect the amount of energy in a fully continuous manner during the time interval the energy detection is performed. However, the energy detection may also operate semi-continuously and, for example, take successive energy samples (that is determine the energy level in a channel such as e.g. the current receiver channel) during the period the energy detection is performed. The taking of an energy sample may for example take a period of time, such as 0.2 milliseconds (ms) or less, 128 microseconds (.mu.s) for example. The taking of an energy sample may for example take a period of time equal to 10 symbol periods or less, such as 8 symbol periods. The symbol rates may for example be 62.5, 50, 40, 25, 20, or 12.5 kilo Symbols per seconds (kS/s). The successive energy samples may for example be taken directly after each other (not taking into account a certain minimum period of time, (much) shorter than the superior margin for the back-off period, e.g. 0.5 ms or less, for example 320 microseconds (.mu.s) or less required to set the energy detector.

The energy samples may then be processed to see if a data transmission process could take place considering the level of interferences found on the channel. In particular, the energy detector 24 may determine if a "free window" can be found, that is a number of consecutive low energy level samples giving sufficient indication that a data transmission is possible to be performed in the present conditions and the channel (frequency) maintained for the receiving process. For instance, the free window may be found in case for example from a set of energy samples, such as 15 samples, at least a number exceeding a predetermined lower limit, e.g. at least 5, consecutive energy samples are showing no activity on the current channel. If the energy detector 24 does not find such a window, the comparator 25 may output the start signal, in order to initiate the selection of a new receiving channel. In case of a fully continuous energy detection, for example, it may be determined whether a free window exists which is define in terms of a period of time instead of a number of samples.

The invention may be implemented as a kit. The kit may for example be provided as a set of separate components which can be connected to each other to assemble a module operating as a transmission device 2 or a receiving device 3 or may be provided as an assembled module of components connected to each other in a manner suitable for operate as the transmission device 2 or the receiving device 3.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the energy detector or other elements of the transmission controllers 22,23 may be implemented as a number of separate components connected in such a manner that they are able to perform the functions of the respective element.

Also, devices functionally forming separate devices may be integrated in a single physical device. For example, the transmitter device may be provided as a single integrated circuit and for example be implemented as a monolithic circuit.

However, other modifications, variations and alternatives are also possible. The specifications and drawings are, accordingly, to be regarded in an illustrative rather than in a restrictive sense.

Unless stated otherwise, terms such as "first" and "second" are used to arbitrarily distinguish between the elements such terms describe. Thus, these terms are not necessarily intended to indicate temporal or other prioritization of such elements In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A device for transmitting data in a wideband wireless network, comprising:
    a transmitter for transmitting data via a channel of said wideband wireless network, said transmitter being arranged to start said transmitting in response to a start signal; and
    a first transmission controller connected to said transmitter, for controlling transmission of data by said transmitter, said first transmission controller including:
        an energy detector for detecting the amount of energy in said channel, said energy detector being arranged to continue said detecting in response to a continue signal;
        a comparator connected to an output of said energy detector and to a control input of said transmitter, said comparator being arranged:
            to compare the detected amount of energy with an energy threshold;
            to output said continue signal to the energy detector in case said detected amount of energy exceeds said energy threshold; and
            to output said start signal to said transmitter when said detected amount of energy is below said energy threshold;
    a second transmission controller connected to said transmitter, said second transmission controller including:
        a reception detector for receiving a reception acknowledgement from a receiving device;
        a timer for timing a period of time lapsed after transmitting said data and controlling the transmitter to retransmit said data when said acknowledgement is not received within a predetermined period of time; and
        a retransmission counter for counting a number of retransmissions and a comparator for comparing said number with a failure threshold, said comparator being arranged to output a transmission failed signal in case said number exceeds said failure threshold; and
    a switch unit for activating said first transmission controller in response to said transmission failed signal from said second transmission controller and deactivating, in response to said transmission failed signal, said second transmission controller.

2. A device as claimed in claim 1, wherein said first transmission controller includes:
a timer for timing a period of time said detecting of the amount of energy has been performed, and
a comparator for comparing said timed period with a failure threshold, said comparator being arranged to output a transmission failed signal in case said timed period exceeds said failure threshold.

3. A device as claimed in claim 1, wherein said transmitter is arranged to transmit remote control data to a remote controlled device.

4. A device as claimed in claim 1, wherein said transmitter is arranged to transmit said data in a period of time of 10 ms or less.

5. A device as claimed in claim 1, said transmitter having a data transmission rate of less than 2 Mb per second.

6. A device as claimed in claim 1, wherein said device is compliant or compatible with the IEEE 802.15.4 standard.

7. An apparatus including a device as claimed in claim 1.

8. A wideband wireless network, including:
a device as claimed in claim 1; and
at least one receiving device.

9. A device as claimed in claim 2, wherein said transmitter is arranged to transmit remote control data to a remote controlled device.

10. A device as claimed in claim 2, wherein said transmitter is arranged to transmit said data in a period of time of 10 ms or less.

11. A device as claimed in claim 3, wherein said transmitter is arranged to transmit said data in a period of time of 10 ms or less.

12. A device as claimed in claim 2, said transmitter having a data transmission rate of less than 2 Mb per second.

13. A device as claimed in claim 3, said transmitter having a data transmission rate of less than 2 Mb per second.

14. The device of claim 1, wherein the switch unit comprises hardware.

15. A method for transmitting data in a wideband wireless network, comprising:
controlling a transmitter to transmit data via a channel of said wideband wireless network, said transmitter being arranged to start said transmitting in response to a start signal, said controlling including:
controlling the transmitter by a first transmission controller, the controlling including: detecting the amount of energy in a frequency band corresponding to said channel;
comparing the detected amount of energy with an energy threshold;
outputting a continue signal in case said detected amount of energy exceeds said energy threshold;
continuing said detecting in response to said continue signal; and
outputting the start signal to said transmitter when said detected amount of energy is below said energy threshold; and
controlling the transmitter by a second transmission controller, the controlling including:
timing a period of time lapsed after the transmitter transmits data;
controlling the transmitter to retransmit said data when an acknowledgement of the transmission of data is not received within a predetermined period of time,
comparing a number of retransmissions with a failure threshold; and
outputting a transmission failed signal in case said number exceeds said failure threshold;
activating said first transmission controller in response to said transmission failed signal from said second transmission controller; and deactivating, in response to said transmission failed signal, said second transmission controller.

16. The method of claim 15, wherein the controlling by the second transmission controller comprises:
detecting the amount of energy in a frequency band corresponding to said channel;
comparing the detected amount of energy with an energy threshold; and
outputting the start signal to said transmitter when said detected amount of energy is below said energy threshold.

17. The method of claim 16, wherein:
the detecting by the first transmission controller comprises detecting the amount of energy in the frequency band corresponding to said channel in a fully continuous manner during a time interval when the energy detection is performed; and
the detecting by the second transmission controller comprises taking a back-off period from further detecting based upon the detected amount of energy exceeding said energy threshold.

18. The method of claim 17, wherein the taking comprises taking a random back-off period from further detecting.

19. The method of claim 17, wherein the taking comprises taking a back-off period from further detecting, the back-off period increasing as the number of back-offs taken increases.

20. A non-transitory computer-readable medium comprising code portions for performing steps of a method for transmitting data in a wideband wireless network when run on a programmable apparatus, the steps comprising:
controlling a transmitter to transmit data via a channel of said wideband wireless network, said transmitter being arranged to start said transmitting in response to a start signal, said controlling including:
controlling the transmitter by a first transmission controller, the controlling including: detecting the amount of energy in a frequency band corresponding to said channel;
comparing the detected amount of energy with an energy threshold;
outputting a continue signal in case said detected amount of energy exceeds said energy threshold;
continuing said detecting in response to said continue signal; and outputting the start signal to said transmitter when said detected amount of energy is below said energy threshold; and
controlling the transmitter by a second transmission controller, the controlling including:
timing a period of time lapsed after the transmitter transmits data;
controlling the transmitter to retransmit said data when an acknowledgement of the transmission of data is not received within a predetermined period of time,
comparing a number of retransmissions with a failure threshold; and
outputting a transmission failed signal in case said number exceeds said failure threshold;
activating said first transmission controller in response to said transmission failed signal from said second transmission controller; and
deactivating, in response to said transmission failed signal, said second transmission controller.

* * * * *